United States Patent
Suciu et al.

(10) Patent No.: US 10,184,402 B2
(45) Date of Patent: *Jan. 22, 2019

(54) CERAMIC MATRIX COMPOSITE TURBINE EXHAUST CASE FOR A GAS TURBINE ENGINE

(71) Applicant: United Technologies Corporation, Farmington, CT (US)

(72) Inventors: Gabriel L. Suciu, Glastonbury, CT (US); Ioannis Alvanos, West Springfield, MA (US); Brian D. Merry, Andover, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,890

(22) Filed: Apr. 9, 2018

(65) Prior Publication Data
US 2018/0230909 A1   Aug. 16, 2018

Related U.S. Application Data

(63) Continuation of application No. 13/116,116, filed on May 26, 2011, now Pat. No. 9,938,900.

(51) Int. Cl.
*F02C 7/20* (2006.01)
*F01D 9/04* (2006.01)
(Continued)

(52) U.S. Cl.
CPC ............... *F02C 7/20* (2013.01); *F01D 9/041* (2013.01); *F01D 25/30* (2013.01); *F02K 1/04* (2013.01);
(Continued)

(58) Field of Classification Search
CPC ..... F02K 9/97; F02K 1/04; F02C 7/20; F01D 9/041; F01D 25/30
See application file for complete search history.

(56) References Cited

U.S. PATENT DOCUMENTS

| | | | |
|---|---|---|---|
| 2,938,336 A | 5/1960 | Peterson | |
| 6,648,597 B1 | 11/2003 | Widrig et al. | |

(Continued)

FOREIGN PATENT DOCUMENTS

| | | |
|---|---|---|
| EP | 1873385 | 1/2008 |
| FR | 2699227 | 6/1994 |

(Continued)

OTHER PUBLICATIONS

Opposition for European Patent No. 2570606. Patent Holder United Technologies Corporation. Challenger Safran Aircraft Engines. Dated Aug. 2, 2016. p. 1-17.

(Continued)

*Primary Examiner* — Craig Kim
(74) *Attorney, Agent, or Firm* — Carlson, Gaskey & Olds, P.C.

(57) ABSTRACT

A gas turbine engine according to an example of the present disclosure includes, among other things, a turbine case extending along a turbine axis and a CMC turbine exhaust case mounted to the turbine case. The CMC turbine exhaust case includes a CMC core nacelle aft portion, a CMC tail cone connected to the CMC core nacelle aft portion, and a multiple of CMC turbine exhaust case struts extending between the CMC core nacelle aft portion and the CMC tail cone. The CMC core nacelle aft portion, the CMC tail cone and the turbine case are arranged along the turbine axis. The CMC turbine exhaust case is mounted to the turbine case at a flange such that the CMC tail cone is axially spaced apart from the turbine case relative to the turbine axis.

20 Claims, 4 Drawing Sheets

(51) Int. Cl.
  *F01D 25/30* (2006.01)
  *F02K 1/04* (2006.01)
(52) U.S. Cl.
  CPC ..... *F05D 2300/6033* (2013.01); *Y02T 50/672* (2013.01); *Y02T 50/673* (2013.01); *Y10T 29/4932* (2015.01)

(56) References Cited

U.S. PATENT DOCUMENTS

| | | | |
|---|---|---|---|
| 7,249,462 B2 | 7/2007 | Aumont et al. | |
| RE39,972 E | 1/2008 | Royalty | |
| 7,805,925 B2 | 10/2010 | Durocher et al. | |
| 7,866,162 B2* | 1/2011 | Blanchard | F02K 1/04 239/265.11 |
| 8,262,345 B2 | 9/2012 | Andrew | |
| 2002/0073690 A1* | 6/2002 | Tse | F02K 1/34 60/204 |
| 2004/0253096 A1 | 12/2004 | Legg | |
| 2006/0147692 A1* | 7/2006 | Kmetz | C04B 35/62868 428/292.1 |
| 2008/0092514 A1* | 4/2008 | Suciu | F02C 3/073 60/39.43 |
| 2009/0226746 A1* | 9/2009 | Chakrabarti | C04B 37/025 428/469 |
| 2012/0279631 A1 | 11/2012 | Mizokami et al. | |

FOREIGN PATENT DOCUMENTS

| | | |
|---|---|---|
| FR | 2949820 | 3/2011 |
| JP | 2000247745 | 9/2000 |
| WO | 2006007686 | 1/2006 |
| WO | 2006060006 | 6/2006 |
| WO | 2009131793 | 10/2009 |
| WO | 2010026354 | 3/2010 |

OTHER PUBLICATIONS

Opposition for European Patent No. 2570606. Patent Holder United Technologies Corporation. Challenger Safran Aircraft Engines. Dated Aug. 2, 2016. p. 1-17. (English Translation).

European Search Report for European Patent Application No. 12169232.1 completed on Aug. 16, 2013.

* cited by examiner

CERAMIC MATRIX COMPOSITE TURBINE EXHAUST CASE FOR A GAS TURBINE ENGINE

CROSS REFERENCE TO RELATED APPLICATIONS

The present disclosure is a continuation of U.S. patent application Ser. No. 13/116,116, filed May 26, 2011.

BACKGROUND

The present disclosure relates to a gas turbine engine, and more particularly to Ceramic Matrix Composites (CMC) turbine exhaust case components therefor.

Components in sections of gas turbine engines which operate at elevated temperatures in a strenuous, oxidizing type of gas flow environment are typically manufactured of high temperature superalloys. The aft most section of the gas turbine engine is typically a turbine exhaust case, having a nozzle and a tail cone that are fastened together to form the assembly.

SUMMARY

A turbine exhaust case for a gas turbine engine according to an exemplary aspect of the present disclosure includes a multiple of CMC turbine exhaust case struts between a CMC core nacelle aft portion and a CMC tail cone.

A gas turbine engine according to an exemplary aspect of the present disclosure includes a CMC turbine exhaust case mounted to a turbine case.

A method of assembling a gas turbine engine according to an exemplary aspect of the present disclosure includes mounting a CMC turbine exhaust case to a turbine case.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
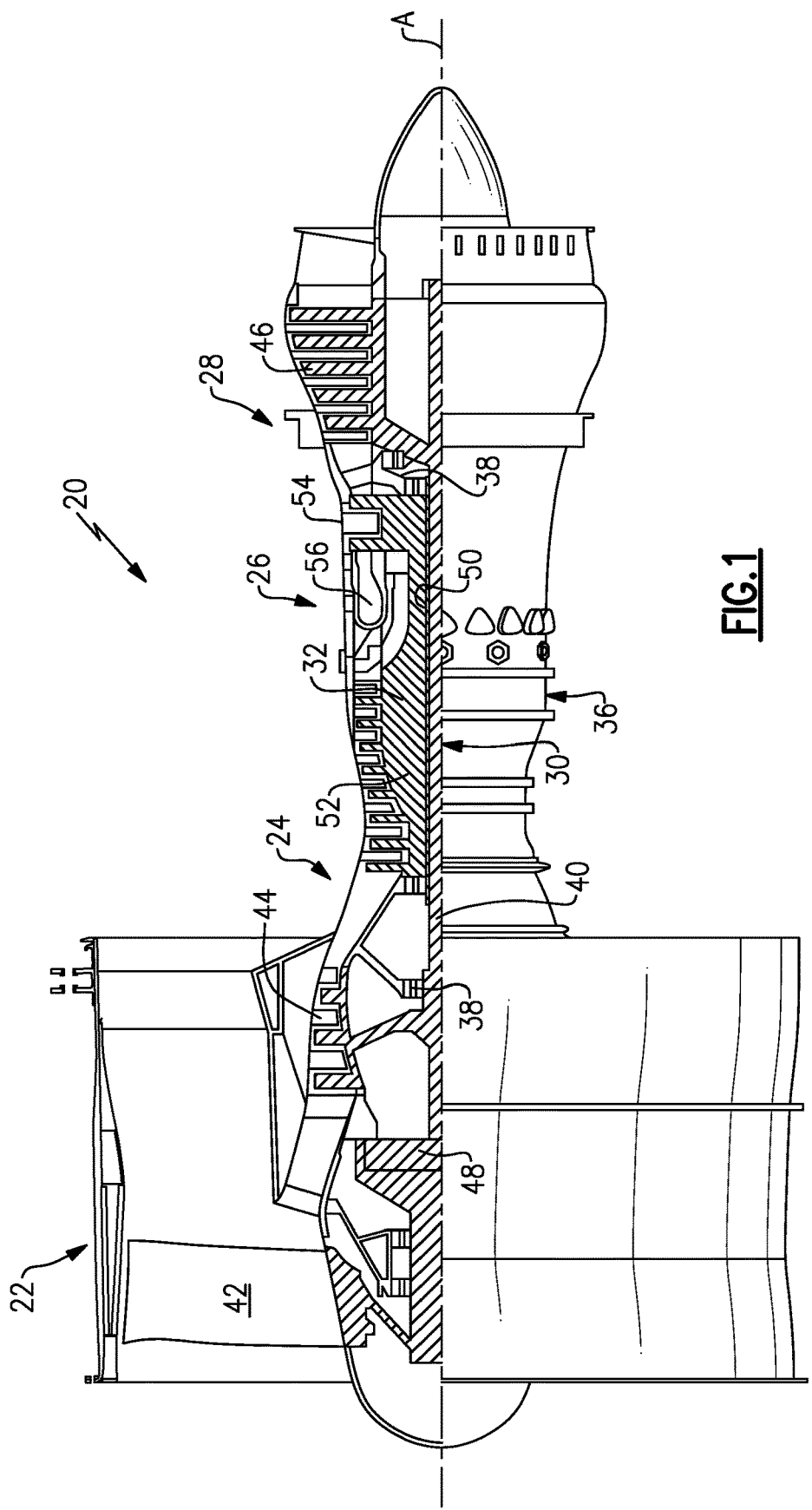
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
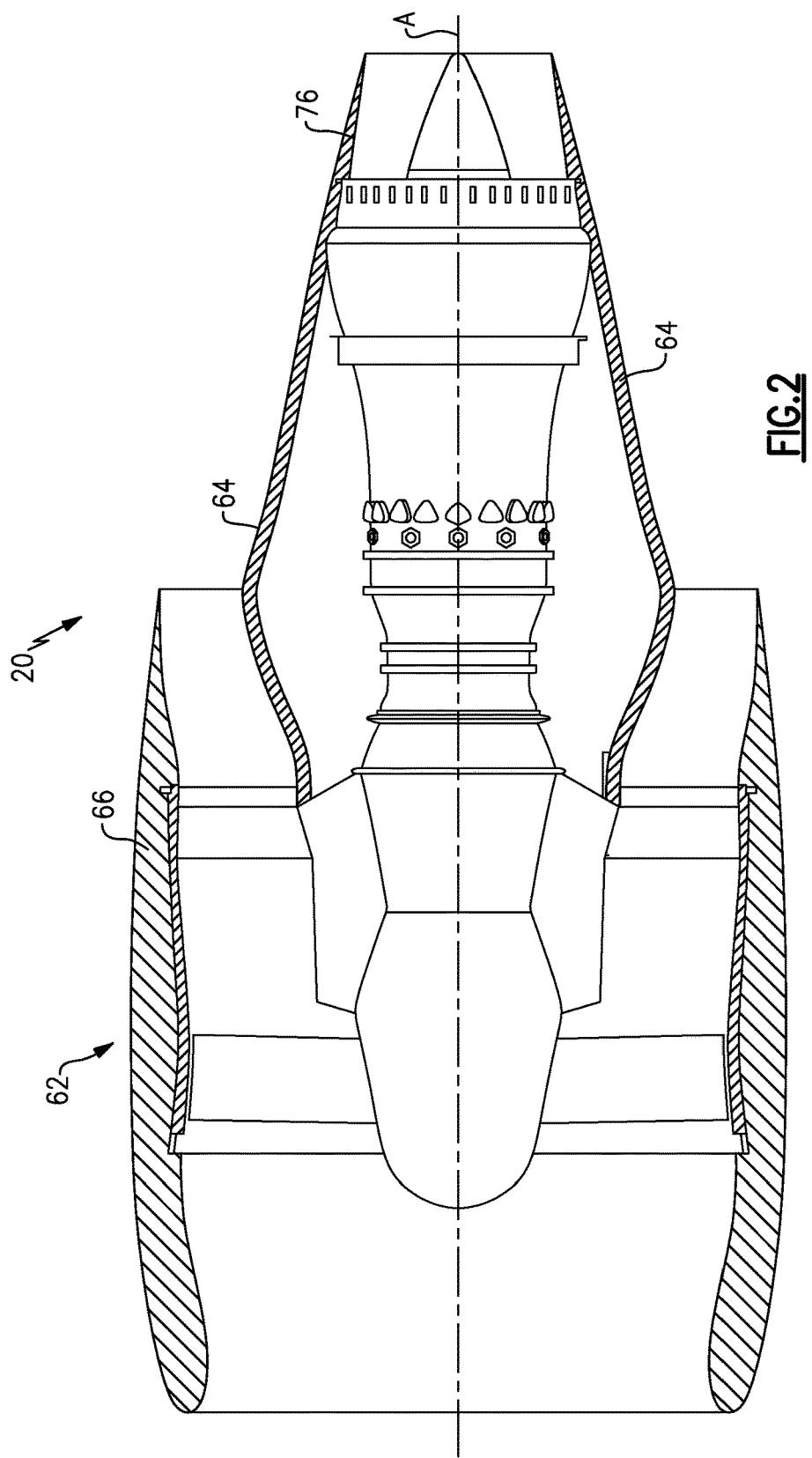
FIG. 2 is an enlarged sectional view of a section of the gas turbine engine.
Figure 3:
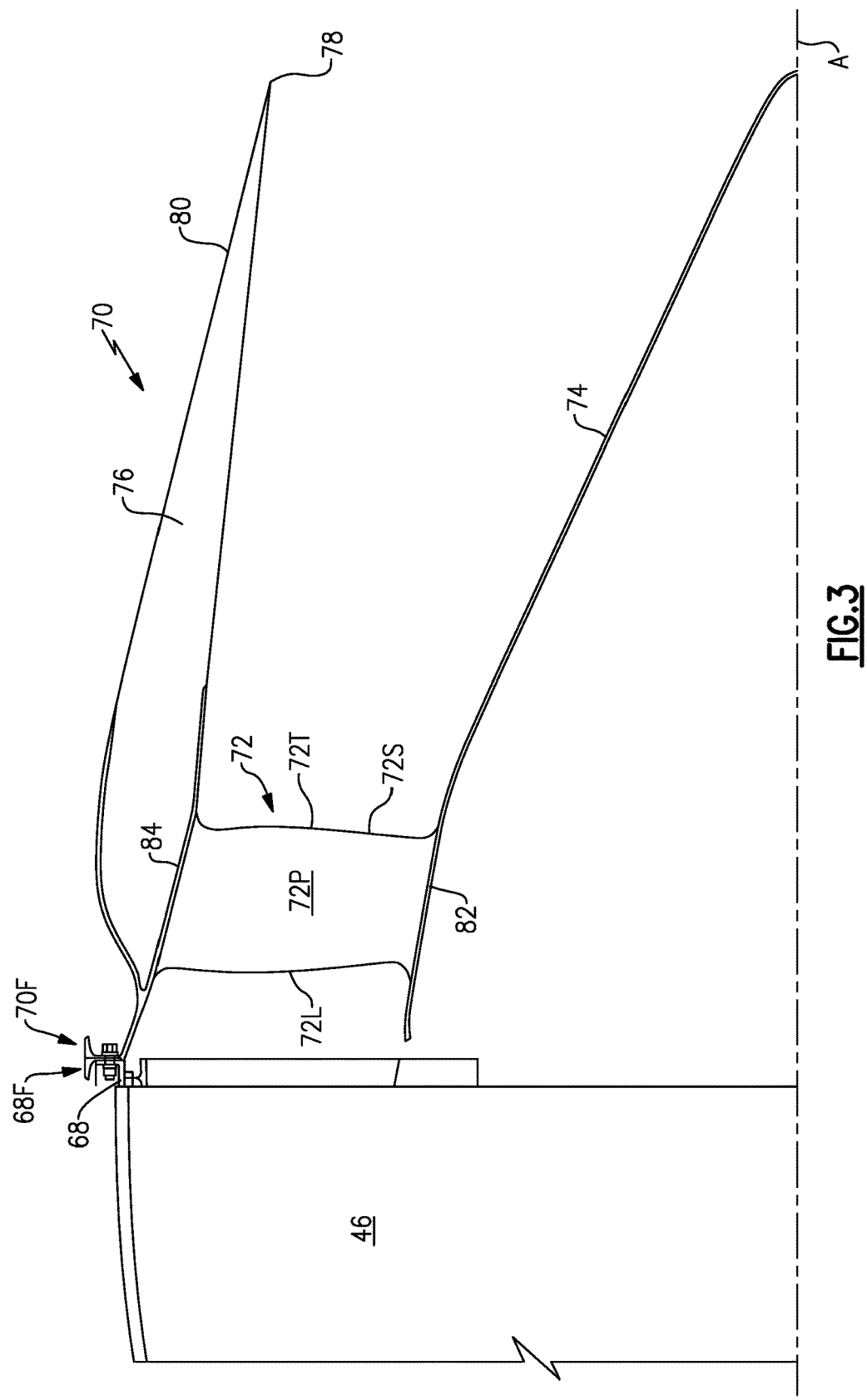
FIG. 3 is a schematic cross-section of a CMC turbine exhaust case mounted to a turbine case.

With reference to FIG. 2, the gas turbine engine 20 is mounted within an engine nacelle assembly 62 as is typical of an aircraft designed for subsonic operation. The nacelle assembly 62 generally includes a core nacelle 64 and a fan nacelle 66. It should be understood that although a particular component arrangement is disclosed in the illustrated embodiment, various pylon structures and nacelle assemblies will benefit herefrom. With reference to FIG. 3, the low pressure turbine 46 generally includes a low pressure turbine case 68 with a multiple of low pressure turbine stages. In one disclosed non-limiting embodiment, the low pressure turbine case 68 is manufactured of a ceramic matrix composite (CMC) material or metal superalloy. It should be understood that examples of CMC material for all componentry discussed herein may include, but are not limited to, for example, 5200 and SiC/SiC. It should be also understood that examples of metal superalloy for all componentry discussed herein may include, but are not limited to, for example, INCO 718 and Waspaloy. Although depicted as a low pressure turbine in the disclosed embodiment, it should be understood that the concepts described herein are not limited to use with low pressure turbine as the teachings may be applied to other sections such as high pressure turbine, high pressure compressor, low pressure compressor and intermediate pressure turbine and intermediate pressure turbine of a three-spool architecture gas turbine engine.

Figure 4:
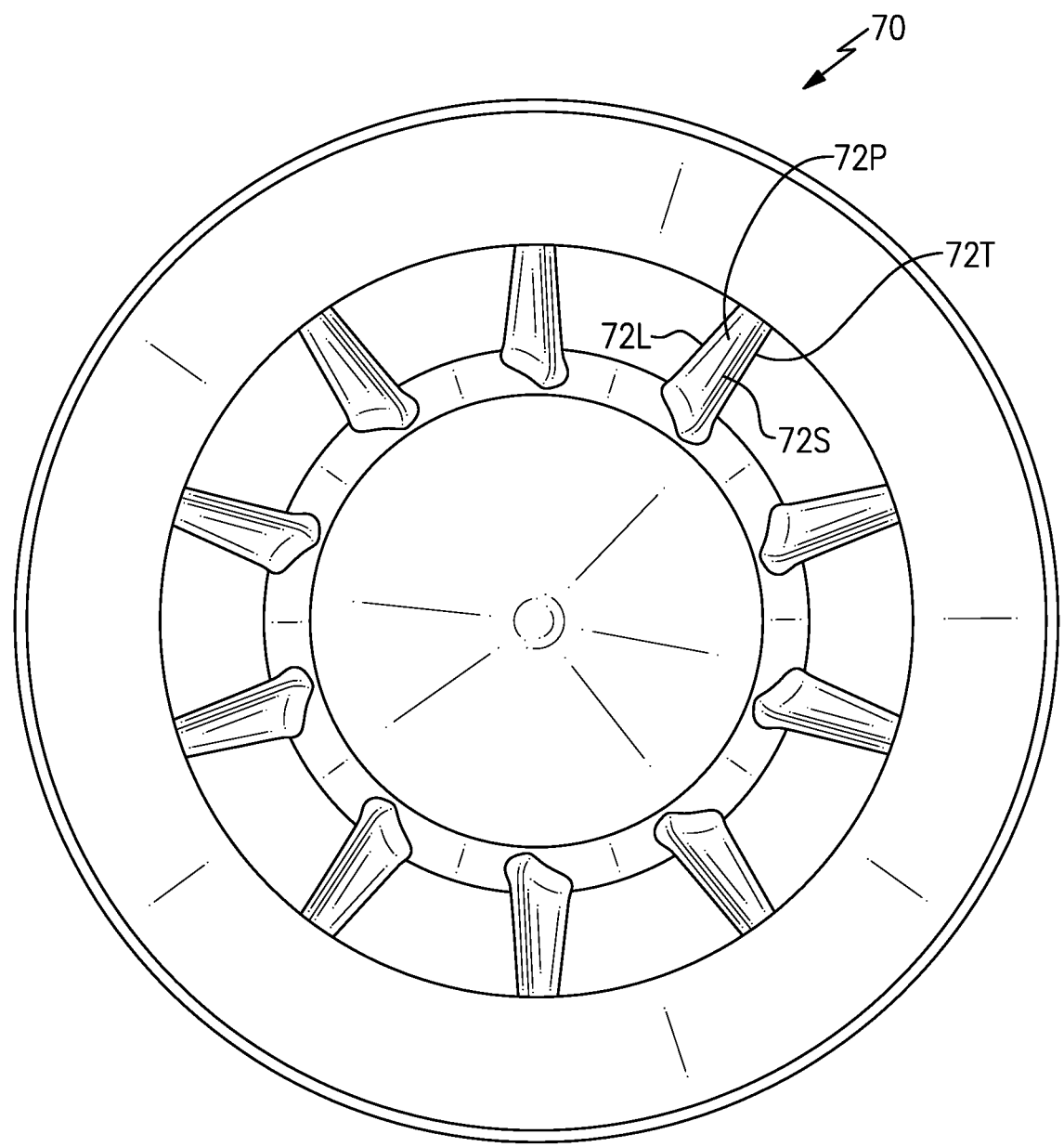
FIG. 4 is a perspective view of the CMC turbine exhaust case.

A CMC turbine exhaust case 70 is mounted downstream of the low pressure turbine 46 at a flange 70F which mounts to a flange 68F of the low pressure turbine case 68. The CMC turbine exhaust case 70 is manufactured of a ceramic matrix composite (CMC) material and defines a multiple of turbine exhaust case struts 72, a tail cone 74 and a core nacelle aft portion 76 as a single integral CMC structure. The multiple of turbine exhaust case struts 72 are radially disposed aerodynamic members may be of various forms and multiples. Although a somewhat generic turbine exhaust case strut 72 will be described herein, it should be understood that various static airfoils may be particularly amenable to the fabrication described herein. Each turbine exhaust case strut 72 is defined between a respective leading edge 72L and a trailing edge 72T. Each turbine exhaust case strut 72 includes a generally concave shaped portion which forms a pressure side 72P and a generally convex shaped portion which forms a suction side 72S (FIG. 4). The CMC tail cone 74 is a generally conical member. The core nacelle aft portion 76 defines a trailing edge 78 and an outer aerodynamic surface 80 for essentially uninterrupted flow along the core nacelle 64. That is, the outer aerodynamic surface 80 is the outermost surface of the core nacelle 64 which heretofor have been independent structures.

In one non-limiting embodiment, the turbine exhaust case 70 possess a ring-strut-ring construction in which the multiple of turbine exhaust case struts 72 are bonded by full inner diameter and outer diameter full hoop rings 82, 84 which respectively extend to form the tail cone 74 and the core nacelle aft portion 76. The tail cone 74 and the core nacelle aft portion 76 extensions may also be formed as full hoop rings to provide the desired rigidity.

The CMC turbine exhaust case 70 provides for significant weight and cost reduction through, for example, the removal of bulking flanges and fasteners.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
   a turbine case extending along a turbine axis; and
   a CMC turbine exhaust case mounted to said turbine case, wherein said CMC turbine exhaust case includes a CMC core nacelle aft portion, a CMC tail cone connected to said CMC core nacelle aft portion, and a multiple of CMC turbine exhaust case struts extending between said CMC core nacelle aft portion and said CMC tail cone; and
   wherein said CMC core nacelle aft portion, said CMC tail cone and said turbine case are arranged along said turbine axis, and said CMC turbine exhaust case is mounted to said turbine case at a flange such that said CMC tail cone is axially spaced apart from said turbine case relative to said turbine axis.

2. The gas turbine engine as recited in claim 1, wherein said CMC core nacelle aft portion,
   said CMC tail cone and said multiple of CMC turbine exhaust case struts are integrally formed as a single CMC structure, and wherein said turbine case is a low pressure turbine case.

3. The gas turbine engine as recited in claim 1, wherein said CMC core nacelle aft portion defines a trailing edge of a core nacelle, and said turbine case is a low pressure turbine case.

4. The gas turbine engine as recited in claim 3, wherein the multiple of CMC turbine exhaust case struts are bonded to said CMC core nacelle aft portion and said CMC tail cone.

5. The gas turbine engine as recited in claim 4, wherein each of said multiple of CMC turbine exhaust case struts includes a concave shaped first portion which forms a pressure side and a convex shaped second portion which forms a suction side.

6. The gas turbine engine as recited in claim 3, wherein said turbine case is manufactured of CMC.

7. The gas turbine engine as recited in claim 6, wherein said CMC core nacelle aft portion, said CMC tail cone and said multiple of CMC turbine exhaust case struts are integrally formed as a single CMC structure.

8. The gas turbine engine as recited in claim 7, wherein each of said multiple of CMC turbine exhaust case struts includes a concave shaped first portion which forms a pressure side and a convex shaped second portion which forms a suction side.

9. The gas turbine engine as recited in claim 8, wherein said CMC core nacelle aft portion defines an outer aerodynamic surface to provide essentially uninterrupted flow along said core nacelle.

10. A method of assembling a gas turbine engine comprising:
    mounting a CMC turbine exhaust case to a turbine case, wherein said CMC turbine exhaust case includes a CMC core nacelle aft portion, a CMC tail cone connected to said CMC core nacelle aft portion, and a multiple of CMC turbine exhaust case struts extending between said CMC core nacelle aft portion and said CMC tail cone;
    defining at least a portion of a core nacelle with the CMC turbine exhaust case; and
    integrally forming said CMC core nacelle aft portion and said CMC tail cone with said multiple of CMC turbine exhaust case struts extending therebetween.

11. The method as recited in claim 10, wherein said turbine case is a low pressure turbine case.

12. The method as recited in claim 11, wherein said turbine case is manufactured of CMC.

13. The method as recited in claim 10, wherein said CMC core nacelle aft portion, said CMC tail cone and said turbine case are arranged along a turbine axis, and said CMC turbine exhaust case is mounted to said turbine case at a flange such that said CMC tail cone is axially spaced apart from said turbine case relative to said turbine axis.

14. The method as recited in claim 13, further comprising:
    defining at least a portion of an aerodynamic outer surface of said core nacelle with said CMC turbine exhaust case.

15. The method as recited in claim 14, further comprising:
    defining a trailing edge of said core nacelle with said CMC turbine exhaust case.

16. The method as recited in claim 15, further comprising:
    forming said CMC core nacelle aft portion and said CMC tail cone as hoop rings.

17. The method as recited in claim 15, further comprising:
    bolting said CMC turbine exhaust case to said turbine case.

18. The method as recited in claim 15, wherein said multiple of CMC turbine exhaust case struts extend between a pair of circular shaped CMC hoop rings, and said CMC hoop rings extend to form said CMC core nacelle aft portion and said CMC tail cone.

19. The method as recited in claim 18, wherein each of said multiple of CMC turbine exhaust case struts includes a concave shaped first portion which forms a pressure side and a convex shaped second portion which forms a suction side.

20. The method as recited in claim 19, wherein said multiple of CMC turbine exhaust case struts are bonded to said pair of circular shaped CMC hoop rings.

* * * * *